(12) United States Patent
Yamashita et al.

(10) Patent No.: US 11,389,703 B2
(45) Date of Patent: Jul. 19, 2022

(54) BAT

(71) Applicant: Mizuno Corporation, Osaka (JP)

(72) Inventors: Yohei Yamashita, Osaka (JP);
Katsuhisa Hirano, Osaka (JP)

(73) Assignee: Mizuno Corporation, Osaka (JP)

( * ) Notice: Subject to any disclaimer, the term of this patent is extended or adjusted under 35 U.S.C. 154(b) by 0 days.

(21) Appl. No.: 16/707,938

(22) Filed: Dec. 9, 2019

(65) Prior Publication Data

US 2021/0170246 A1  Jun. 10, 2021

(51) Int. Cl.
| | | |
|---|---|---|
| *A63B 59/50* | (2015.01) | |
| *A63B 102/18* | (2015.01) | |
| *B32B 5/02* | (2006.01) | |
| *B32B 5/26* | (2006.01) | |
| *B32B 27/12* | (2006.01) | |

(52) U.S. Cl.
CPC ............. *A63B 59/50* (2015.10); *B32B 5/024* (2013.01); *B32B 5/26* (2013.01); *B32B 27/12* (2013.01); *A63B 2102/18* (2015.10); *A63B 2102/182* (2015.10); *A63B 2209/023* (2013.01); *B32B 2260/021* (2013.01); *B32B 2260/046* (2013.01); *B32B 2262/0253* (2013.01); *B32B 2262/0269* (2013.01); *B32B 2262/101* (2013.01); *B32B 2262/106* (2013.01)

(58) Field of Classification Search
CPC ............. A63B 59/50; A63B 2102/182; A63B 2209/023; A63B 2102/18; B32B 27/12; B32B 5/024; B32B 5/26; B32B 2260/021; B32B 2262/0269; B32B 2260/046; B32B 2262/101; B32B 2262/106; B32B 2262/0253
See application file for complete search history.

(56) References Cited

U.S. PATENT DOCUMENTS

| | | | | |
|---|---|---|---|---|
| 4,848,745 A | * | 7/1989 | Bohannan | A63B 59/50 473/119 |
| 5,048,441 A | * | 9/1991 | Quigley | B29C 53/8008 114/90 |
| 5,114,144 A | * | 5/1992 | Baum | B27M 3/22 473/567 |
| 6,042,493 A | * | 3/2000 | Chauvin | A63B 59/51 473/566 |

(Continued)

*Primary Examiner* — Steven B Wong
(74) *Attorney, Agent, or Firm* — Troutman Pepper Hamilton Sanders, LLP; James E. Schutz; Korbin M. Blunck

(57) ABSTRACT

A bat includes a ball hitting portion. The ball hitting portion includes a plurality of fiber-reinforced resin layers stacked in a radial direction relative to a center axis of the ball hitting portion. The plurality of fiber-reinforced resin layers include a first fiber-reinforced resin layer disposed at an outermost circumference in the radial direction among the plurality of fiber-reinforced resin layers. The first fiber-reinforced resin layer has a plurality of first fiber bundles and a plurality of second fiber bundles. The plurality of first fiber bundles are disposed side by side in a short side direction of each of the plurality of first fiber bundles. The plurality of second fiber bundles are disposed side by side in a short side direction of each of the plurality of second fiber bundles. The plurality of first fiber bundles and the plurality of second fiber bundles are woven across one another.

11 Claims, 10 Drawing Sheets

(56) References Cited

U.S. PATENT DOCUMENTS

| | | | | |
|---|---|---|---|---|
| 6,723,012 | B1* | 4/2004 | Sutherland | A63B 59/54 |
| | | | | 473/567 |
| 6,761,653 | B1* | 7/2004 | Higginbotham | A63B 60/54 |
| | | | | 473/566 |
| 10,265,595 | B1* | 4/2019 | Stenzler | A63B 60/42 |
| 2004/0048022 | A1* | 3/2004 | Pratt | A63B 60/54 |
| | | | | 428/36.91 |
| 2004/0198539 | A1* | 10/2004 | Sutherland | B29C 70/48 |
| | | | | 473/567 |
| 2008/0051230 | A1* | 2/2008 | Davis | A63B 59/54 |
| | | | | 473/564 |
| 2009/0163307 | A1* | 6/2009 | Fujii | A63B 59/51 |
| | | | | 473/564 |
| 2009/0215559 | A1* | 8/2009 | McNamee | A63B 59/50 |
| | | | | 473/567 |
| 2010/0125014 | A1* | 5/2010 | Watari | A63B 59/56 |
| | | | | 473/566 |
| 2012/0108371 | A1* | 5/2012 | Epling | A63B 59/50 |
| | | | | 473/566 |
| 2013/0280476 | A1* | 10/2013 | Davis | B32B 5/022 |
| | | | | 428/109 |
| 2013/0280477 | A1* | 10/2013 | Davis | B32B 5/022 |
| | | | | 428/109 |
| 2014/0335752 | A1* | 11/2014 | Ettin | B32B 5/26 |
| | | | | 442/199 |
| 2017/0252617 | A1* | 9/2017 | Caron Kardos | B32B 5/245 |
| 2017/0297295 | A1* | 10/2017 | Bhatnagar | B29B 15/105 |
| 2018/0169491 | A1* | 6/2018 | Gray | A63B 60/02 |

* cited by examiner

BAT

BACKGROUND OF THE INVENTION

Field of the Invention

The present invention relates to a bat.

Description of the Background Art

Conventionally, a bat has been known which includes a ball hitting portion including a stack of a plurality of fiber-reinforced resin (FRP) layers. Such a bat is referred to as a composite bat, for example. The fiber-reinforced resin layers of the conventional composite bat are formed by winding a prepreg through sheet winding or filament winding.

Since the restitution coefficient of the composite bat is increased as detachment between the plurality of fiber-reinforced resin layers is more advanced, a specific regulation is placed on the restitution coefficient of the composite bat.

Specifically, the restitution coefficient of the composite bat is measured by an ABI (Accelerate Break In) test method defined by each league. First, an initial restitution coefficient of the composite bat is measured. Next, rigidity of the composite is measured. Then, the ball hitting portion thereof is compressed using a roller to accelerate detachment between the plurality of fiber-reinforced resin layers. In the present specification, this compressing step is referred to as "break acceleration step". Next, the rigidity and restitution coefficient of the composite bat are measured again. Such a series of tests are performed until the composite bat becomes broken. It should be noted that for a softball bat, the above-described break is determined in the case where a crack presumed to be formed inside is confirmed when a surface of the composite bat is visually observed. Moreover, for a hardball baseball bat, the above-described break is determined in the following cases: a crack presumed to be formed inside is confirmed when the surface of the composite bat is visually observed as with the softball bat; and no rebounding of a ball can be measured in a restitution test even though no crack is confirmed.

A restitution coefficient (hereinafter, referred to as "final restitution coefficient") measured just before the break is recorded as the restitution coefficient of the composite bat. Only composite bats having restitution coefficients satisfying the specification are permitted to be used in regular games.

In the case of a normal composite bat, the break acceleration step is performed multiple times until the composite bat becomes broken. Hence, the initial restitution coefficient of the normal composite bat needs to be suppressed to be low in view of an increasing rate of the restitution coefficient such that the final restitution coefficient satisfies the above-described specification.

Consequently, a user who purchased a brand-new composite bat may alter the composite bat to increase the restitution coefficient to be higher than the initial restitution coefficient. Moreover, existence of a service provider of altering the composite bat on behalf of the user has been also known.

Meanwhile, if the initial restitution coefficient is increased to attain a low increasing rate of the restitution coefficient, break needs to occur in a short period of time, with the result that durability of the composite bat needs to be low.

SUMMARY OF THE INVENTION

An object of the present disclosure is to provide a bat that is less likely to be broken during use and that falls out of the specification when it is altered.

A bat according to the present embodiment includes: a grip portion; a tapered portion connected to the grip portion; and a ball hitting portion connected to the tapered portion and disposed to be aligned with the tapered portion and the grip portion in one direction. A center axis of the ball hitting portion extends along the one direction. The ball hitting portion includes a plurality of fiber-reinforced resin layers stacked in a radial direction relative to the center axis. The plurality of fiber-reinforced resin layers include a first fiber-reinforced resin layer disposed at an outermost circumference in the radial direction among the plurality of fiber-reinforced resin layers. The first fiber-reinforced resin layer includes a woven fabric in which a plurality of first fiber bundles extending in a first direction and a plurality of second fiber bundles extending in a second direction are woven. The plurality of first fiber bundles are disposed side by side in a short side direction of each of the plurality of first fiber bundles. The plurality of second fiber bundles are disposed side by side in a short side direction of each of the plurality of second fiber bundles. The plurality of first fiber bundles and the plurality of second fiber bundles are woven across one another.

The summary above is not intended to describe all the embodiments and implementations. The detailed description below more particularly illustrates exemplary embodiments. The present application provides a list of examples usable in various combinations. In each of the examples, the list merely serves as a representative group and should not be interpreted as being exclusive.

The foregoing and other objects, features, aspects and advantages of the present invention will become more apparent from the following detailed description of the present invention when taken in conjunction with the accompanying drawings.

Each of the figures is not necessarily to scale. The same numerals used in the figures indicate the same components. However, it is understood that use of a numeral to denote a certain component in a certain figure is not intended to limit a component labeled with the same numeral in a different figure.

DESCRIPTION OF THE PREFERRED EMBODIMENTS

First Embodiment

Figure 1:
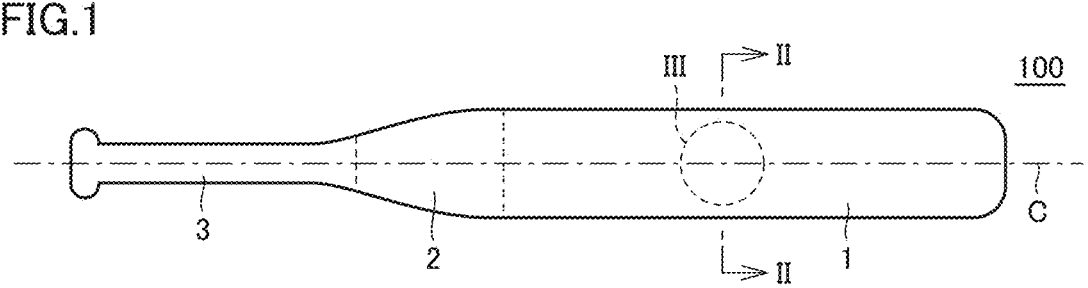
FIG. 1 shows a bat according to a first embodiment.

A bat 100 is used to hit a ball in baseball or softball. As shown in FIG. 1, bat 100 includes a ball hitting portion 1, a tapered portion 2, and a grip portion 3. Ball hitting portion 1 is a portion for hitting a ball. Grip portion 3 is a portion gripped by a user (batter). Tapered portion 2 is a portion that connects ball hitting portion 1 and grip portion 3 to each other. Ball hitting portion 1, tapered portion 2, and grip portion 3 are disposed to be aligned with one another in one direction.

As shown in FIG. 1, center axis C of ball hitting portion 1 extends along the one direction. Center axis C of ball hitting portion 1 is provided to be coaxial with the center axis of tapered portion 2 and the center axis of grip portion 3.

Figure 2:
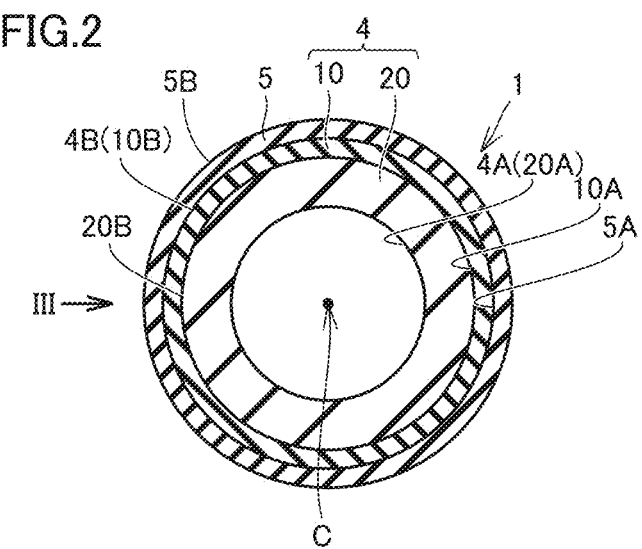
FIG. 2 is a cross sectional view when seen from an arrow II-II in FIG. 1.

As shown in FIG. 2, ball hitting portion 1 includes a plurality of fiber-reinforced resin layers 4 and a protective layer 5. The plurality of fiber-reinforced resin layers 4 and protective layer 5 are stacked in a radial direction (hereinafter, simply referred to as "radial direction") relative to center axis C. The plurality of fiber-reinforced resin layers 4 are stacked on one another in the radial direction. Protective layer 5 is disposed on ball hitting portion 1 at the outermost circumference in the radial direction.

As shown in FIG. 2, the plurality of fiber-reinforced resin layers 4 have an innermost circumferential surface 4A in the radial direction, and an outermost circumferential surface 4B in the radial direction. As shown in FIG. 2, protective layer 5 has an innermost circumferential surface 5A in the radial direction, and an outermost circumferential surface 5B in the radial direction. In ball hitting portion 1, a region surrounded by innermost circumferential surface 4A may be hollow or may be provided with an elastic body, for example. Outermost circumferential surface 4B of the plurality of fiber-reinforced resin layers 4 is in contact with innermost circumferential surface 5A of protective layer 5. Outermost circumferential surface 5B of protective layer 5 forms the outermost circumferential surface of ball hitting portion 1.

As shown in FIG. 2, the plurality of fiber-reinforced resin layers 4 have a first fiber-reinforced resin layer 10 and a plurality of second fiber-reinforced resin layers 20. First fiber-reinforced resin layer 10 and the plurality of second fiber-reinforced resin layers 20 are stacked in the radial direction. First fiber-reinforced resin layer 10 is disposed at the outermost circumference of the plurality of fiber-reinforced resin layers 4 in the radial direction. The plurality of second fiber-reinforced resin layers 20 are disposed at the innermost circumference of the plurality of fiber-reinforced resin layers 4 in the radial direction. The plurality of second fiber-reinforced resin layers 20 are stacked on one another in the radial direction.

As shown in FIG. 2, first fiber-reinforced resin layer 10 has an innermost circumferential surface 10A in the radial direction, and an outermost circumferential surface 10B in the radial direction. Outermost circumferential surface 10B of first fiber-reinforced resin layer 10 forms outermost circumferential surface 4B of the plurality of fiber-reinforced resin layers 4. As shown in FIG. 2, the plurality of second fiber-reinforced resin layers 20 have an innermost circumferential surface 20A in the radial direction, and have an outermost circumferential surface 20B in the radial direction. Innermost circumferential surface 20A of the plurality of second fiber-reinforced resin layers 20 forms innermost circumferential surface 4A of the plurality of fiber-reinforced resin layers 4. Innermost circumferential surface 10A of first fiber-reinforced resin layer 10 is in contact with outermost circumferential surface 20B of the plurality of second fiber-reinforced resin layers 20.

Figure 3:
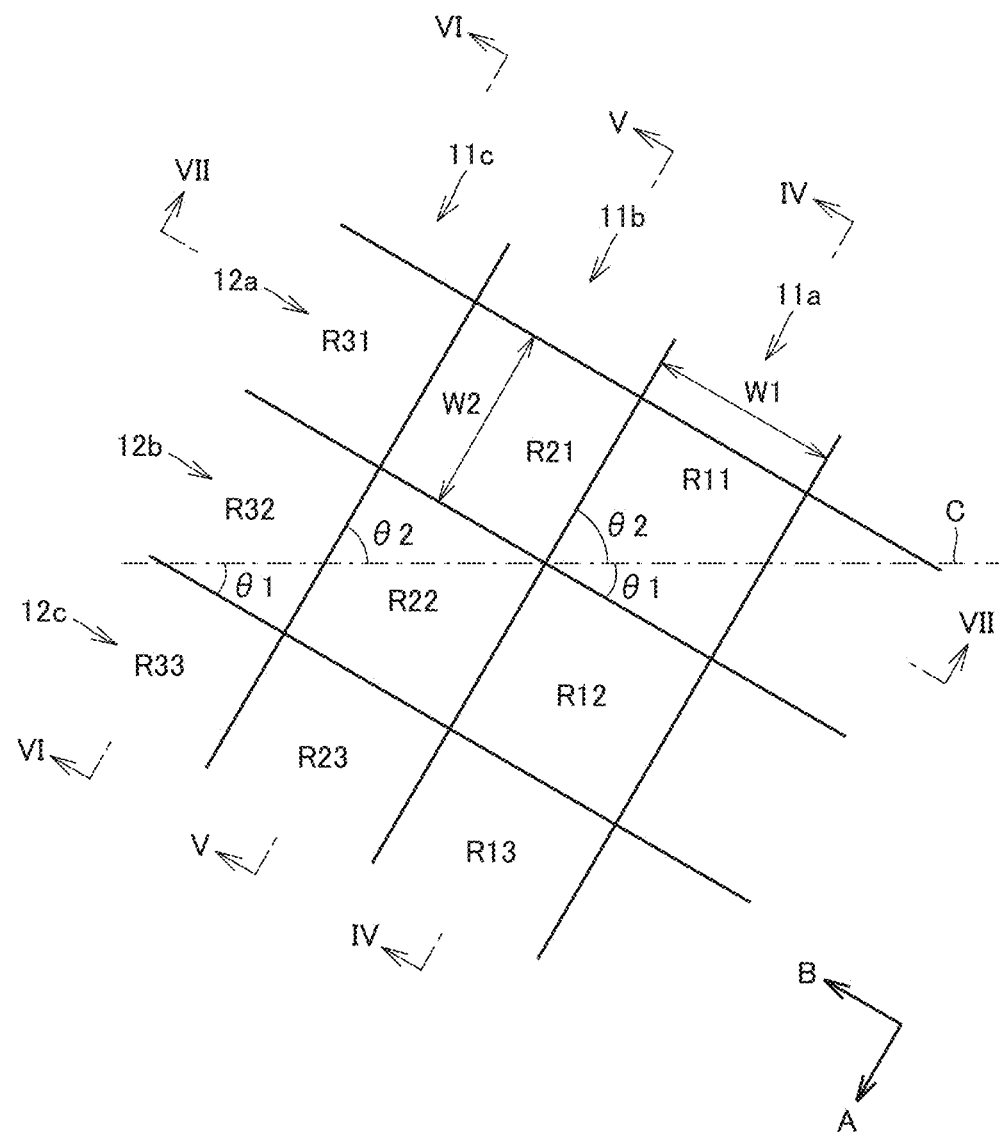
FIG. 3 is a partial enlarged plan view of a first fiber-reinforced resin layer in a region III in FIG. 1.

FIG. 3 is a partial enlarged plan view when first fiber-reinforced resin layer 10 in a region III in FIG. 1 is seen from the outer circumferential side in the radial direction. As shown in FIG. 3, first fiber-reinforced resin layer 10 has: a plurality of first fiber bundles 11a, 11b, 11c and a plurality of second fiber bundles 12a, 12b, 12c woven across one another; and a resin provided in and around each of the plurality of first fiber bundles 11a, 11b, 11c and the plurality of second fiber bundles 12a, 12b, 12c. First fiber-reinforced resin layer 10 is obtained by thermally curing a sheet-like woven fabric formed by weaving a plurality of tow prepregs across one another, for example. The plurality of first fiber bundles 11a, 11b, 11c and the plurality of second fiber bundles 12a, 12b, 12c are formed by spreading tow fibers, for example. The woven fabric that forms first fiber-reinforced resin layer 10 can be formed by way of various weaves such as plain weave, twill, or sateen. Since one having ordinary skill in the art understands the meaning of the spread weave as well as the meanings of the plain weave, the twill, and the sateen, further descriptions thereof are not required. It should be noted that the tow prepreg is obtained by providing a resin in and around a tow fiber. The tow fiber is a bundle of a plurality of filaments. Each filament is a bundle of a plurality of individual fibers. The plurality of filaments in the tow fiber are combined with one another, for example. Each of the plurality of first fiber bundles 11a, 11b, 11c and second fiber bundles 12a, 12b, 12c includes a plurality of filaments (details will be described below).

Each individual fiber included in the plurality of first fiber bundles 11a, 11b, 11c and the plurality of second fiber bundles 12a, 12b, 12c is at least one selected from a group of a carbon fiber, a glass fiber, an aramid fiber, a polyethylene fiber, a poly-para-phenylenebenzobisoxazole (PBO) fiber, a basalt fiber, and a boron fiber, for example. The resin of first fiber-reinforced resin layer 10 may be a thermosetting resin or a thermoplastic resin, and includes at least one selected from a group of an epoxy resin, a phenol resin, a polyester resin, and a vinyl ester resin, for example.

As shown in FIG. 3, each of first fiber bundles 11a, 11b, 11c and second fiber bundles 12a, 12b, 12c has a long side direction and a short side direction orthogonal to each other. The long side direction of each of first fiber bundles 11a, 11b, 11c and the short side direction of each of second fiber bundles 12a, 12b, 12c are along a first direction A. In other words, first fiber bundles 11a, 11b, 11c extend in first direction A. The short side direction of each of first fiber bundles 11 and the long side direction of each of second fiber bundles 12a, 12b, 12c are along a second direction B. In other words, second fiber bundles 12a, 12b, 12c extend in second direction B. First direction A is orthogonal to second direction B. First fiber bundles 11a, 11b, 11c are disposed side by side in this order in second direction B. Second fiber bundles 12a, 12b, 12c are disposed side by side in this order in first direction A. It should be noted that each of crossing angles of first fiber bundles 11a, 11b, 11c with second fiber bundles 12a, 12b, 12c is not necessarily limited to a vertical angle. For example, each of squares formed by the fiber bundles may be changed to a rhombus by plain-weaving first fiber bundles 11a, 11b, 11c and second fiber bundles 12a, 12b, 12c at a non-vertical crossing angle.

As shown in FIG. 3, first fiber-reinforced resin layer 10 has a first region R11, a second region R12, a third region R13, a fourth region R21, a fifth region R22, a sixth region R23, a seventh region R31, an eighth region R32, and a ninth region R33, for example.

As shown in FIG. 3, first region R11, second region R12, and third region R13 are disposed side by side in this order in first direction A. Fourth region R21, fifth region R22, and sixth region R23 are disposed side by side in this order in first direction A. Seventh region R31, eighth region R32, and ninth region R33 are disposed side by side in this order in first direction A. First region R11, fourth region R21, and seventh region R31 are disposed side by side in this order in second direction B. Second region R12, fifth region R22, and eighth region R32 are disposed side by side in this order in second direction B. Third region R13, sixth region R23, and ninth region R33 are disposed side by side in this order in second direction B.

Each of FIG. 4 to FIG. 7 is a cross sectional view when seen from an arrow shown in FIG. 3. In each of FIG. 4 to FIG. 7, each member is schematically illustrated. Particularly, only parts of fiber lines of first fiber bundles 11a, 11b, 11c and second fiber bundles 12a, 12b, 12c are illustrated schematically. Moreover, a dotted line in first fiber-reinforced resin layer 10 in each of FIG. 4 to FIG. 7 schematically illustrates a boundary line resulting from the outer shape of the tow prepreg. The boundary line can be confirmed by appropriate cross section observation.

Figure 4:
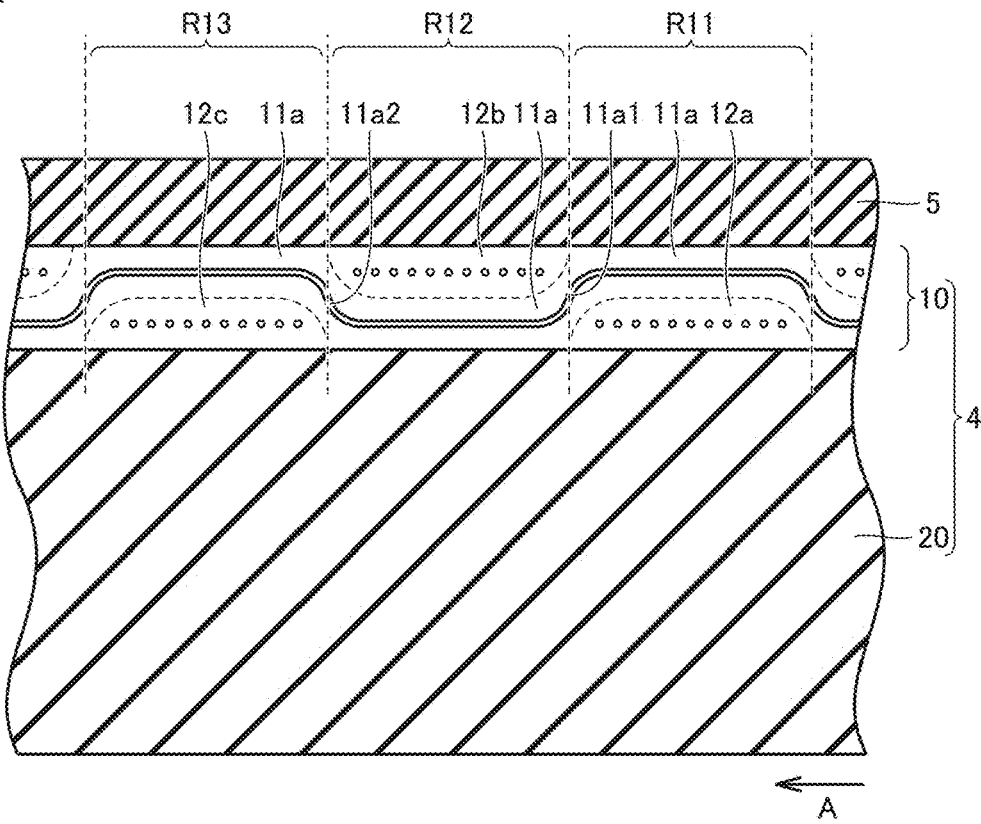
FIG. 4 is a cross sectional view when seen from an arrow IV-IV in FIG. 3.

As shown in FIG. 4, in first region R11, first fiber bundle 11a and second fiber bundle 12a are stacked on each other in the radial direction, and first fiber bundle 11a is disposed at the outer circumferential side relative to second fiber bundle 12a. In second region R12, first fiber bundle 11a and second fiber bundle 12b are stacked on each other in the radial direction, and first fiber bundle 11a is disposed at the inner circumferential side relative to second fiber bundle 12b. In third region R13, first fiber bundle 11a and second fiber bundle 12c are stacked on each other in the radial direction, and first fiber bundle 11a is disposed at the outer circumferential side relative to second fiber bundle 12c.

Figure 5:
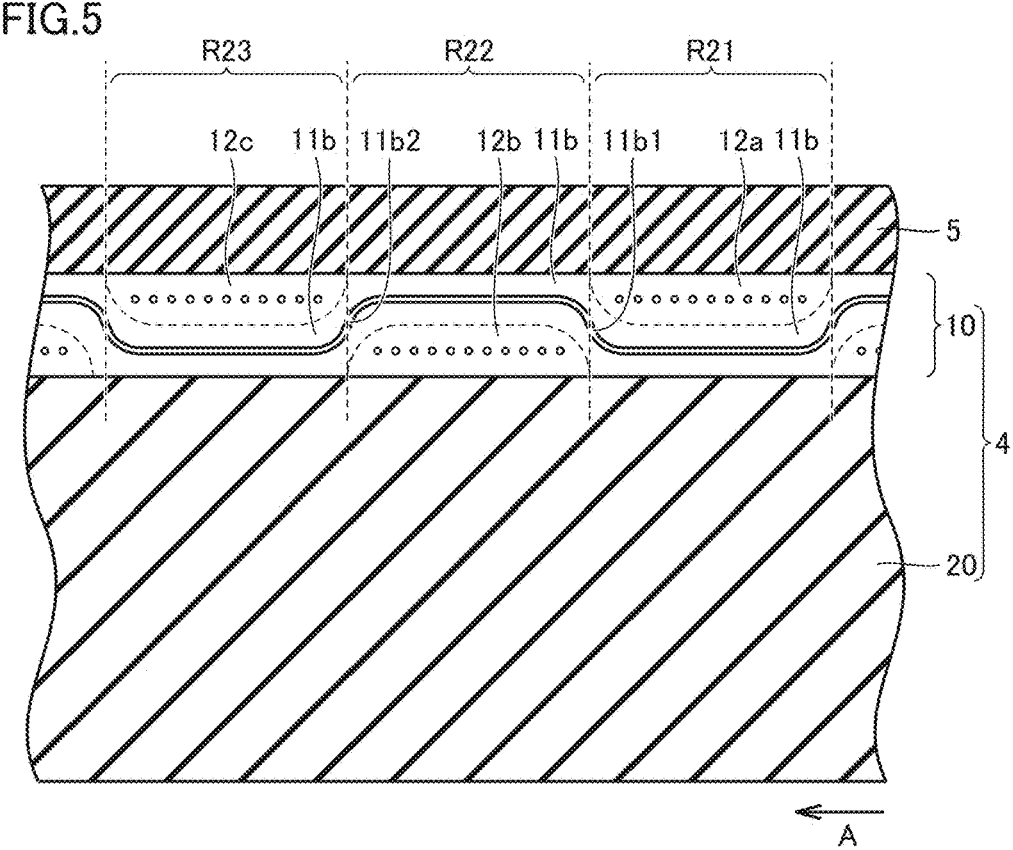
FIG. 5 is a cross sectional view when seen from an arrow V-V in FIG. 3.

As shown in FIG. 5, in fourth region R21, first fiber bundle 11b and second fiber bundle 12a are stacked on each other in the radial direction, and first fiber bundle 11b is disposed at the inner circumferential side relative to second fiber bundle 12a. In fifth region R22, first fiber bundle 11b and second fiber bundle 12b are stacked on each other in the radial direction, and first fiber bundle 11b is disposed at the outer circumferential side relative to second fiber bundle 12b. In sixth region R23, first fiber bundle 11b and second fiber bundle 12c are stacked on each other in the radial direction, and first fiber bundle 11b is disposed at the inner circumferential side relative to second fiber bundle 12c.

Figure 6:
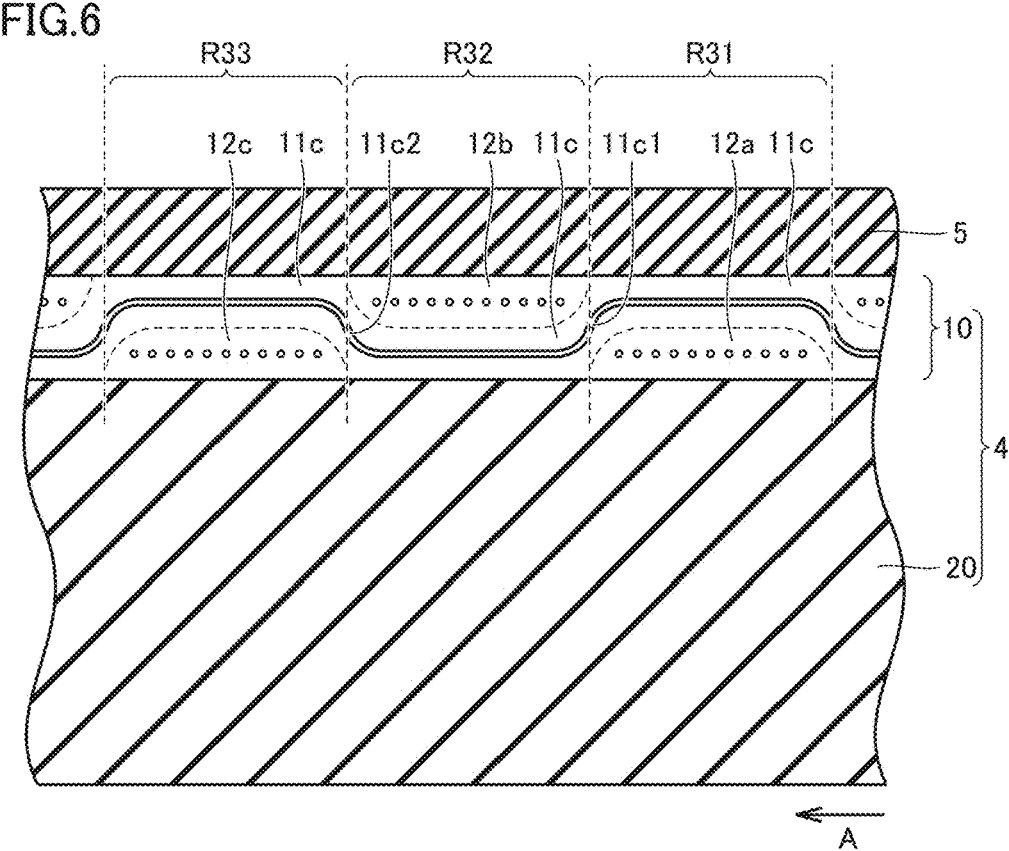
FIG. 6 is a cross sectional view when seen from an arrow VI-VI in FIG. 3.

As shown in FIG. 6, in seventh region R31, first fiber bundle 11c and second fiber bundle 12a are stacked on each other in the radial direction, and first fiber bundle 11c is disposed at the outer circumferential side relative to second fiber bundle 12a. In eighth region R32, first fiber bundle 11c and second fiber bundle 12b are stacked on each other in the radial direction, and first fiber bundle 11c is disposed at the inner circumferential side relative to second fiber bundle 12b. In ninth region R33, first fiber bundle 11c and second fiber bundle 12c are stacked on each other in the radial direction, and first fiber bundle 11c is disposed at the outer circumferential side relative to second fiber bundle 12c.

From a different viewpoint, it can be said that first fiber-reinforced resin layer 10 has: a plurality of first stacking regions in which first fiber bundles 11a, 11b, 11c disposed at the outer circumferential side and second fiber bundles 12a, 12b, 12c disposed at the inner circumferential side in the radial direction are stacked; and a plurality of second stacking regions in which first fiber bundles 11a, 11b, 11c disposed at the inner circumferential side and second fiber bundles 12a, 12b, 12c disposed at the outer circumferential side in the radial direction are stacked. The plurality of first stacking regions have first region R11, third region R13, fifth region R22, seventh region R31, and ninth region R33. The plurality of second stacking regions have second region R12, fourth region R21, sixth region R23, and eighth region R32.

It should be noted that in first fiber-reinforced resin layer 10, regions other than first fiber bundles 11a, 11b, 11c and second fiber bundles 12a, 12b, 12c are provided with a resin. In the first stacking region, the resin is provided at: a region located at the outer circumferential side relative to the plurality of second fiber-reinforced resin layers 20 and located at the inner circumferential side relative to second fiber bundles 12a, 12b, 12c in the radial direction; a region located at the outer circumferential side relative to second fiber bundles 12a, 12b, 12c and located at the inner circumferential side relative to first fiber bundles 11a, 11b, 11c in the radial direction; and a region located at the outer circumferential side relative to first fiber bundles 11a, 11b, 11c in the radial direction. In the second stacking region, the resin is provided at: a region located at the outer circumferential side relative to the plurality of second fiber-reinforced resin layers 20 and located at the inner circumferential side relative to first fiber bundles 11a, 11b, 11c in the radial direction; a region located at the outer circumferential side relative to first fiber bundles 11a, 11b, 11c and located at the inner circumferential side relative to second fiber bundles 12a, 12b, 12c in the radial direction; and a region located at the outer circumferential side relative to second fiber bundles 12a, 12b, 12c in the radial direction. Innermost circumferential surface 10A and outermost circumferential surface 10B of first fiber-reinforced resin layer 10 are constituted of the resin.

As shown in FIG. 3, each of the plurality of first stacking regions is disposed between two adjacent second stacking regions in the long side direction of each of first fiber bundles 11a, 11b, 11c, and is disposed between two adjacent second stacking regions in the short side direction of each of first fiber bundles 11a, 11 b, 11c. For example, fifth region R22 serving as a first stacking region is disposed between fourth region R21 and sixth region R23 serving as two adjacent second stacking regions in the long side direction of first fiber bundle 11b, and is disposed between second region R12 and eighth region R32 serving as two adjacent second stacking regions in the short side direction of first fiber bundle 11b.

As shown in FIG. 4 to FIG. 6, in the cross section along the radial direction and first direction A, first fiber bundle 11 extends in a meandering manner. First fiber bundle 11a has: a portion 11a1 extending between first region R11 and second region R12 along the radial direction; and a portion 11a2 extending between second region R12 and third region R13 along the radial direction. First fiber bundle 11b has: a portion 11b1 extending between fourth region R21 and fifth region R22 along the radial direction; and a portion 11b2 extending between fifth region R22 and sixth region R23 along the radial direction. First fiber bundle 11c has: a portion 11c1 extending between seventh region R31 and eighth region R32 along the radial direction; and a portion 11c2 extending between eighth region R32 and ninth region R33 along the radial direction.

Figure 7:
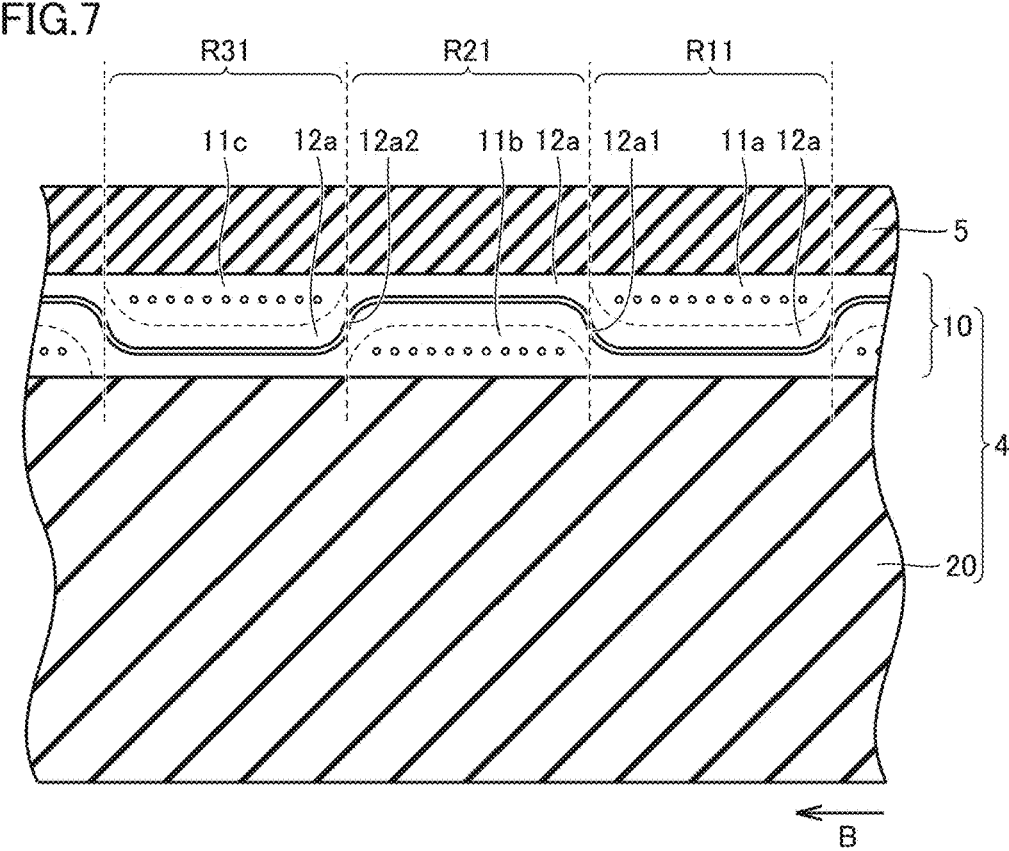
FIG. 7 is a cross sectional view when seen from an arrow VII-VII in FIG. 3.

As shown in FIG. 7, in the cross section along the radial direction and second direction B, second fiber bundle 12 extends in a meandering manner. Second fiber bundle 12a has: a portion 12a1 extending between first region R11 and fourth region R21 along the radial direction; and a portion 12a2 extending between fourth region R21 and seventh region R31 along the radial direction. It should be noted that although not illustrated in the figures, second fiber bundle 12b has: a portion extending between second region R12 and fifth region R22 along the radial direction; and a portion extending between fifth region R22 and eighth region R32 along the radial direction. Second fiber bundle 12c has: a portion extending between third region R13 and sixth region R23 along the radial direction; and a portion extending between sixth region R23 and ninth region R33 along the radial direction.

It should be noted that each of the plurality of first fiber bundles 11a, 11b, 11 c and the plurality of second fiber bundles 12a, 12b, 12c may be constituted of a non-spread tow fiber.

The weight per unit area of first fiber-reinforced resin layer 10 is preferably, but is not limited to be, larger than the weight per unit area of the plurality of second fiber-reinforced resin layers 20. The weight per unit area of first fiber-reinforced resin layer 10 may be less than the weight per unit area of the plurality of second fiber-reinforced resin layers 20, or may be the same as the weight per unit area of the plurality of second fiber-reinforced resin layers 20. The weight per unit area of first fiber-reinforced resin layer 10 is preferably more than or equal to 80 g/m$^2$ and less than or equal to 300 g/m$^2$. The thickness of first fiber-reinforced resin layer 10 in the radial direction is thicker than the thickness of protective layer 5 in the radial direction, and is thinner than the thickness of the plurality of second fiber-reinforced resin layers 20 in the radial direction.

As shown in FIG. 3, when seen in the radial direction, a first angle θ1 formed relative to center axis C by each of the short side directions of first fiber bundles 11a, 11b, 11c overlapping with center axis C is more than or equal to −90° and less than or equal to 90°. For example, first angle θ1 is more than −45° and less than 0°. For example, first angle θ1 is −30°. As shown in FIG. 3, when seen in the radial direction, a second angle θ2 formed relative to center axis C by each of the short side directions of second fiber bundles 12a, 12b, 12c overlapping with center axis C is more than or equal to −90° and less than or equal to 90°. For example, second angle θ2 is more than 45° and less than 90°. For example, second angle θ2 is 60°. In the description herein, a positive angle represents an angle formed at one side (upper side in FIG. 3) relative to center axis C, and a negative angle represents an angle formed at the other side (lower side in FIG. 3) relative to center axis C when seen in the radial direction. As shown in FIG. 3, when seen in the radial direction, each of first fiber bundles 11a, 11b, 11c is orthogonal to second fiber bundles 12a, 12b, 12c. It should be noted that each of the long side directions of first fiber bundles 11a, 11b, 11 c may be inclined at an angle of less than 90° relative to each of the long side directions of second fiber bundles 12a, 12b, 12c.

First width W1 of the short side direction of each of first fiber bundles 11a, 11b, 11c and second width W2 of the short side direction of each of second fiber bundles 12a, 12b, 12c are more than or equal to 3 mm and less than or equal to 20 mm, for example. First width W1 of the short side direction of each of first fiber bundles 11a, 11b, 11c is equal to second width W2 of the short side direction of each of second fiber bundles 12a, 12b, 12c, for example. First width W1 of each of first fiber bundles 11a, 11b, 11c is wider than the thickness of each of first fiber bundles 11a, 11 b, 11c in the radial direction. Second width W2 of each of second fiber bundles 12a, 12b, 12c is wider than the thickness of each of second fiber bundles 12a, 12b, 12c in the radial direction.

The plurality of second fiber-reinforced resin layers 20 are obtained by thermally curing a stack formed by winding a tow prepreg through sheet winding or filament winding, for example. The plurality of second fiber-reinforced resin layers 20 have a third fiber bundle and a resin provided in and around the third fiber bundle. The third fiber bundle is constituted of a non-spread tow fiber, for example. The number of second fiber-reinforced resin layers 20 in the plurality of second fiber-reinforced resin layers 20 is more than or equal to 3 and less than or equal to 30, for example. When seen in the radial direction, a third angle formed relative to center axis C by the short side direction of the third fiber bundle is more than or equal to −90° and less than or equal to 90°. For example, one of two adjacent second fiber-reinforced resin layers 20 in the radial direction and the other of the two second fiber-reinforced resin layers 20 have third angles equal in magnitude and opposite in positive and negative signs. When the third angle of one of the two adjacent second fiber-reinforced resin layers 20 in the radial direction is 30°, the third angle of the other of the two second fiber-reinforced resin layers 20 is −30°, for example.

When seen in the radial direction, the angle formed relative to center axis C by the long side direction of the third fiber bundle is more than or equal to −90° and less than or equal to 90°. The long side direction of the third fiber bundle located at the outermost circumference in the radial direction in the plurality of second fiber-reinforced resin layers 20 crosses at least one of the long side directions of second fiber bundles 12a, 12b, 12c disposed at the inner circumferential side in the first stacking region and first fiber bundles 11a, 11b, 11c disposed at the inner circumferential side in the second stacking region, for example. It should be noted that the long side direction of the third fiber bundle located at the outermost circumference in the radial direction in the plurality of second fiber-reinforced resin layers 20 may be along at least one of the long side directions of second fiber bundles 12a, 12b, 12c disposed at the inner circumferential side in the first stacking region and first fiber bundles 11a, 11b, 11c disposed at the inner circumferential side in the second stacking region, for example.

A material of protective layer 5 includes an appropriate synthetic resin. Protective layer 5 may be provided with a decoration, trademark, or the like that can be visually recognized from outside, for example.

Figure 8:
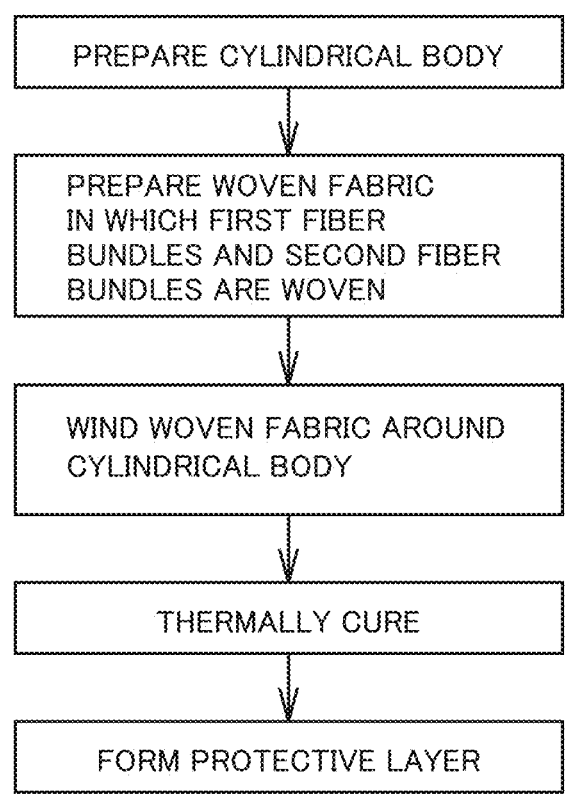
FIG. 8 is a flowchart of a method for manufacturing the bat according to the first embodiment.

Next, a method for manufacturing bat 100 will be described. Bat 100 is manufactured, for example, by preparing ball hitting portion 1, tapered portion 2, and grip portion 3 as separate members, and then assembling them. Tapered portion 2 and grip portion 3 can be prepared in the same manner as those in the conventional bat. Hereinafter, with reference to FIG. 8, an exemplary method for manufacturing ball hitting portion 1 will be described.

First, a cylindrical body to serve as the plurality of second fiber-reinforced resin layers 20 is prepared. The cylindrical body is formed by winding a first tow prepreg around a core member through sheet winding or filament winding, for example. The core member has, for example, a cylindrical shape, and the center axis of the cylindrical body is coaxial with the center axis of the core member. The first tow prepreg is obtained by providing a resin in and around a non-spread tow fiber, for example.

Next, a woven fabric to serve as first fiber-reinforced resin layer 10 is prepared. The woven fabric is formed by weaving a second tow prepreg, for example. The second tow prepreg is obtained by providing a resin in and around a spread tow fiber, for example.

Next, the woven fabric is wound around the cylindrical body. One end of the woven fabric is connected to the other end of the woven fabric in the circumferential direction relative to the center axis of the cylindrical body. In other words, the number of times of winding of the woven fabric is 1.

Next, the cylindrical body and the woven fabric are heated and then cooled. Accordingly, the resin in each of the first tow prepreg and the second tow prepreg is cured to form the plurality of fiber-reinforced resin layers 4 including first fiber-reinforced resin layer 10 and the plurality of second fiber-reinforced resin layers 20 shown in FIG. 2 to FIG. 9. Next, protective layer 5 is formed on the outer circumference of the plurality of fiber-reinforced resin layers 4. Accordingly, ball hitting portion 1 is manufactured.

The present inventors confirmed that when ball hitting portion 1 of bat 100 was subjected to the above-described ABI test, a crack was generated in the resin within first fiber-reinforced resin layer 10 by performing the break acceleration step once. Accordingly, the restitution coefficient of bat 100 is the initial restitution coefficient measured before the break acceleration step performed once in the ABI test. As a result, the initial restitution coefficient of bat 100 can be set to a value around the upper limit value of the restitution coefficient of the bat defined by each league, thereby eliminating the above-described need of alteration.

Meanwhile, the present inventors conducted an endurance test onto a plurality of bats 100 (specifically, bats having the same configurations as those of samples 1 to 8 described later) based on results of measurements of strains generated in bats 100 when hitting balls, so as to determine whether or not each of bats 100 could be endured to hit balls a predetermined number of times. As a result, all the bats 100 passed the endurance test. That is, each bat 100 was less likely to be broken when hitting balls as compared with the above-described low-rigidity composite bat, and had high durability while eliminating the need of alteration of the above-described high-rigidity composite bat. These evaluation results will be described later.

Bat 100 is suitable for a baseball bat or a softball bat. A restitution performance of bat 100 can be set based on a restitution performance standard set by each league.

Second Embodiment

A bat according to a second embodiment includes basically the same configuration as that of bat 100 according to the first embodiment but is different from bat 100 in that first angle θ1 of first fiber-reinforced resin layer 10 is −45°.

Figure 9:
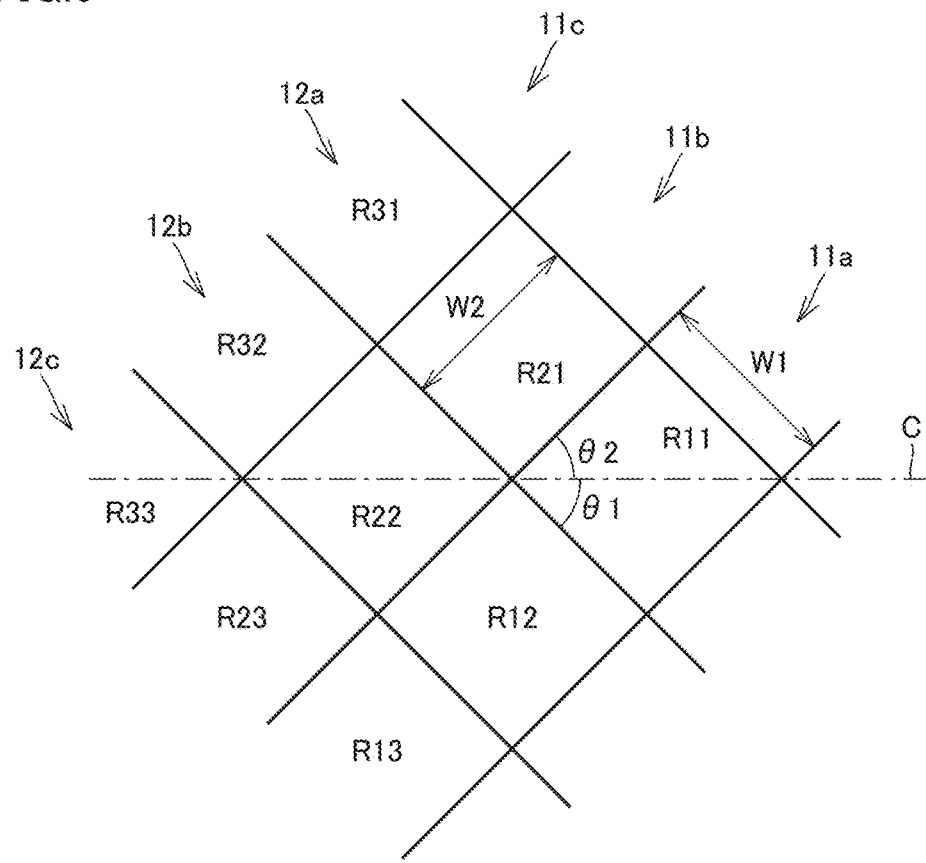
FIG. 9 is a partial enlarged plan view of a first fiber-reinforced resin layer of a bat according to a second embodiment.

FIG. 9 is a partial enlarged plan view when first fiber-reinforced resin layer 10 of the bat according to the second embodiment is seen in the radial direction. In first fiber-reinforced resin layer 10 shown in FIG. 9, first angle θ1 is −45°, and second angle θ2 is 45°.

Third Embodiment

A bat according to a third embodiment includes basically the same configuration as that of bat 100 according to the first embodiment but is different from bat 100 in that first angle θ1 of first fiber-reinforced resin layer 10 is 90°.

Figure 10:
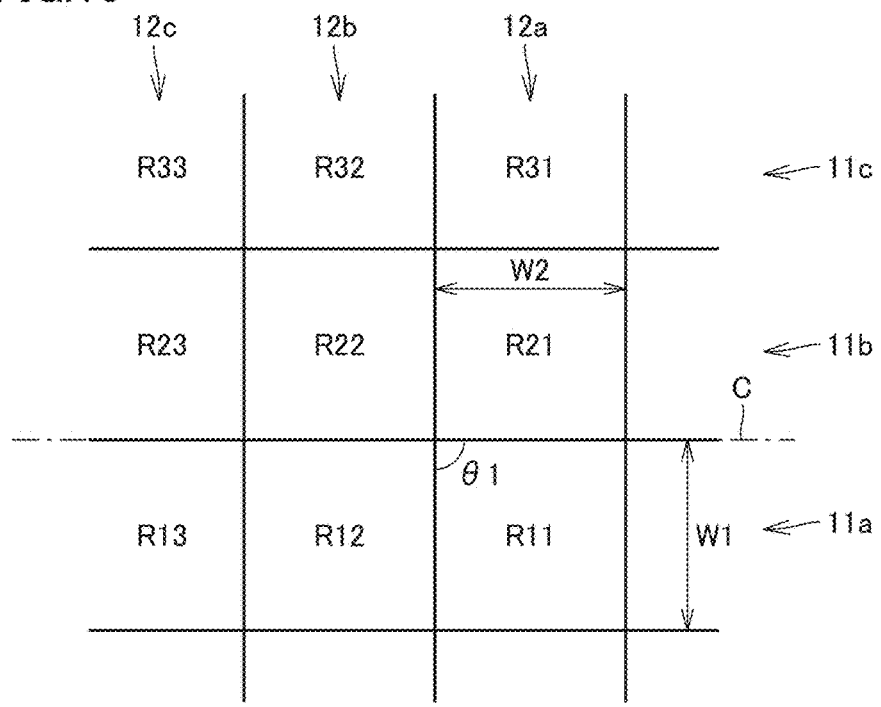
FIG. 10 is a partial enlarged plan view of a first fiber-reinforced resin layer of a bat according to a third embodiment.

FIG. 10 is a partial enlarged plan view when first fiber-reinforced resin layer 10 of the bat according to the second embodiment is seen in the radial direction. In first fiber-reinforced resin layer 10 shown in FIG. 10, first angle θ1 is 90° and second angle θ2 is 0°.

EXAMPLES

The following describes the results of the evaluation test onto bats 100 according to the present embodiment.

Experiment 1

In the present experiment 1, an influence of first width W1 and second width W2 of first fiber-reinforced resin layer 10 on a result of the ABI test defined by the USA Softball was evaluated.

For bat 100 according to the first embodiment, samples 1, 2, and 3 were prepared which were different from one another in first widths W1 and second widths W2 of first fiber-reinforced resin layers 10. Each of first width W1 and second width W2 of sample 1 was set to 10 mm. Each of first width W1 and second width W2 of sample 2 was set to 3 mm. Each of first width W1 and second width W2 of sample 3 was set to 20 mm. It should be noted that for first fiber-reinforced resin layer 10 of each of samples 1 to 3, first angle θ1 was set to −30° and second angle θ2 was set to 60°.

The weight per unit area of first fiber-reinforced resin layer 10 of each of samples 1 to 3 was set to 300 g/m². The weight per unit area of second fiber-reinforced resin layers 20 of each of samples 1 to 3 was set to 300 g/m². Each of second fiber-reinforced resin layers 20 was obtained by winding a tow prepreg multiple times through sheet winding. The third angle formed relative to center axis C by the short side direction of the third fiber bundle of second fiber-reinforced resin layers 20 of each of samples 1 and 2 was set to ±30°. The third angle formed relative to center axis C by the short side direction of the third fiber bundle of second fiber-reinforced resin layers 20 of sample 3 was set to 0°. It should be noted that each of the first fiber bundle and the second fiber bundle was constituted of a spread tow fiber, and the third fiber bundle was constituted of a non-spread tow fiber. Each fiber line of the first fiber bundle, the second fiber bundle, and the third fiber bundle was a carbon fiber. The resin in each of the first fiber bundle, the second fiber bundle, and the third fiber bundle was an epoxy resin. Protective layer 5 of each of samples 1 to 3 was a clear coating layer. The thickness of protective layer 5 was set to 0.03 mm. The outer diameter of ball hitting portion 1 of each of samples 1 and 2 was set to 56 mm.

Each of the ball hitting portions of samples 1 to 3 was subjected to the above-described break acceleration step only once in the ABI test defined by the USA Softball, so as to check whether or not break occurred through visual observation of the surface thereof.

Figure 11:
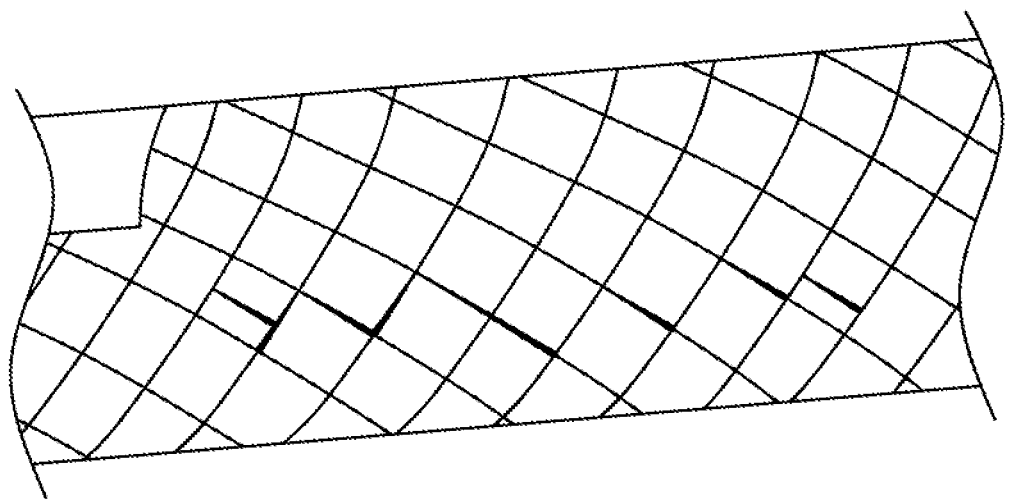
FIG. 11 shows a photograph showing an external appearance of a bat according to a sample 1 after a break acceleration step.
Figure 12:
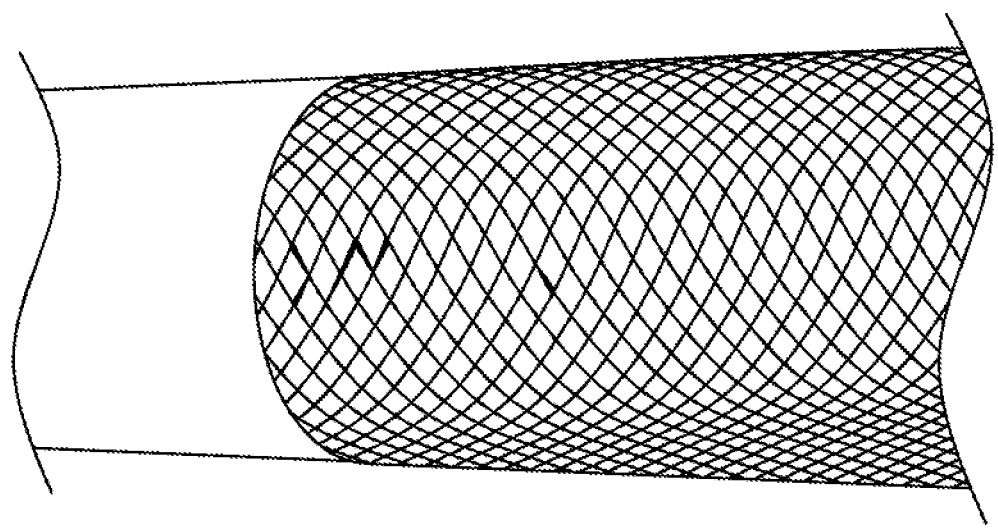
FIG. 12 shows a photograph showing an external appearance of a bat according to a sample 2 after the break acceleration step.
Figure 13:
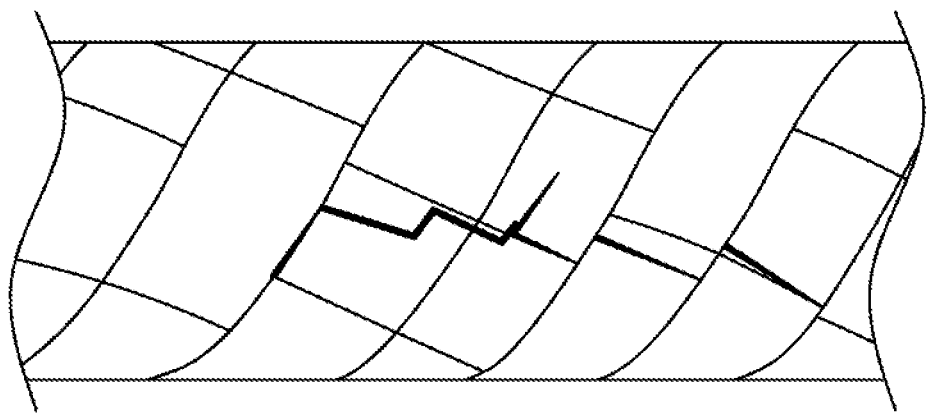
FIG. 13 shows a photograph showing an external appearance of a bat according to a sample 3 after the break acceleration step.

FIG. 11 shows a photograph showing an external appearance of the bat according to sample 1 after the break acceleration step. FIG. 12 shows a photograph showing an external appearance of the bat according to sample 2 after the break acceleration step. FIG. 13 shows a photograph showing an external appearance of the bat according to sample 3 after the break acceleration step.

As shown in FIG. 11 to FIG. 13, in each of samples 1 to 3, a crack was confirmed on a boundary line between the first stacking region and the second stacking region adjacent to each other. However, the crack of sample 1 was visually recognized more readily than the crack of sample 2. The crack of sample 3 was visually recognized more readily than the cracks of samples 1 and 2. In view of the results of samples 1 to 3, it can be said that as first width W1 and second width W2 are wider, a crack visually recognized more readily is generated.

Experiment 2

In the present experiment 2, in view of a comparison between the evaluation results of samples 1 and 3, an influence of the third angle on the result of the ABI test defined by the USA Softball was evaluated, the third angle being formed relative to center axis C by the short side direction of the third fiber bundle of second fiber-reinforced resin layer 20 located at the outermost circumference in the radial direction. As described above, the third angle of sample 1 was set to ±30°. The third angle of sample 3 was set to 0°.

It was confirmed that a manner of generation of a crack was not greatly different between sample 1 shown in FIG. 11 and sample 3 shown in FIG. 13. In view of the results of sample 1 and sample 3, it can be said that the third angle does not have a large influence on the manner of generation of a crack in first fiber-reinforced resin layer 10.

Experiment 3

In the present experiment 3, an influence of the weight per unit area of first fiber-reinforced resin layer 10 on the result of the ABI test defined by the USA Softball was evaluated. For bat 100 according to the first embodiment, a sample 4 was prepared which was different from sample 3 in the weight per unit area of first fiber-reinforced resin layer 10. As described above, the weight per unit area of first fiber-reinforced resin layer 10 of sample 3 was set to 300 g/m$^2$. The weight per unit area of first fiber-reinforced resin layer 10 of sample 4 was set to 88 g/m$^2$. The configurations of each first fiber bundle and each second fiber bundle in sample 3 were the same as those in sample 4, with the result that the above-described difference between the weight per unit areas were caused only due to amounts of fibers in first fiber-reinforced resin layers 10. It should be noted that the other configurations of sample 4 were the same as those of sample 3.

Further, for the bat according to the second embodiment, samples 5 and 6 were prepared which were different from each other in the weights per unit area of first fiber-reinforced resin layers 10. The configurations of each first fiber bundle and each second fiber bundle in sample 5 were the same as those in sample 6, with the result that the above-described difference between the weights per unit area were caused only due to amounts of fibers in first fiber-reinforced resin layers 10. The weight per unit area of first fiber-reinforced resin layer 10 of sample 5 was set to 300 g/m$^2$. The weight per unit area of first fiber-reinforced resin layer 10 of sample 6 was set to 88 g/m$^2$. It should be noted that sample 5 was different from sample 3 only in first angle θ1 and second angle θ2. Sample 6 was different from sample 4 only in first angle θ1 and second angle θ2. For the first fiber-reinforced resin layer 10 of each of samples 5 and 6, first angle θ1 was set to 45°, and second angle θ2 was set to −45°.

Next, each of the ball hitting portions of samples 3 to 6 was compressed using a roller under the same conditions as those in the above-described break acceleration step in the ABI test defined by the USA Softball, so as to check whether or not break occurred through visual observation of the surface thereof.

Figure 14:
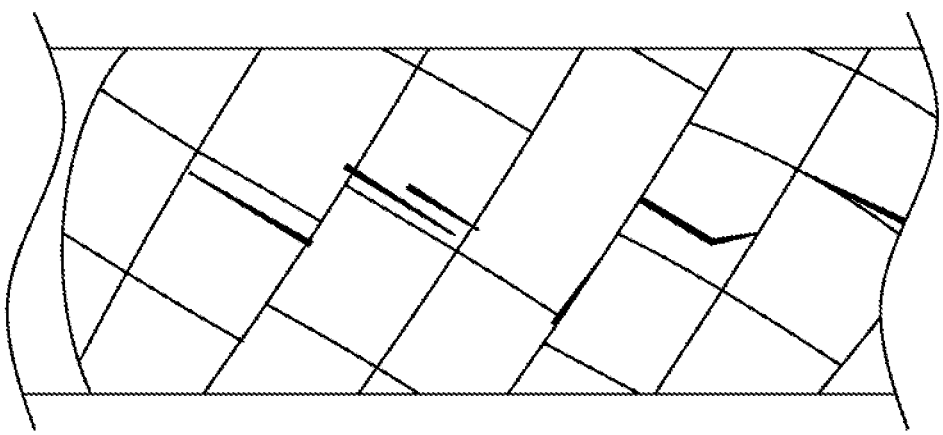
FIG. 14 shows a photograph showing an external appearance of a bat according to a sample 4 after the break acceleration step.
Figure 15:
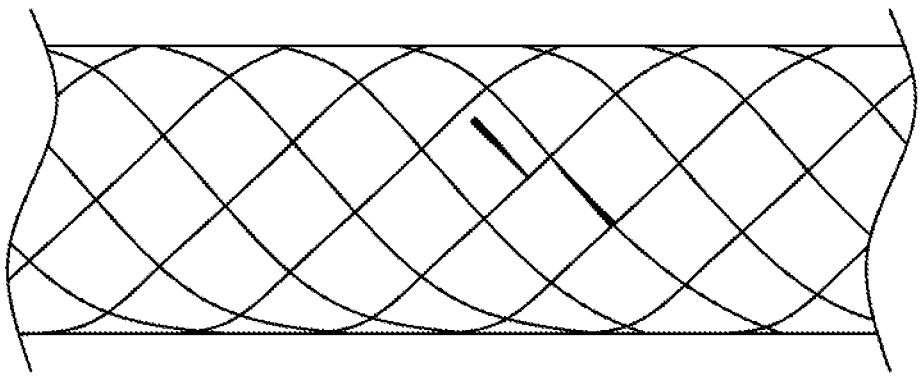
FIG. 15 shows a photograph showing an external appearance of a bat according to a sample 5 after the break acceleration step.
Figure 16:
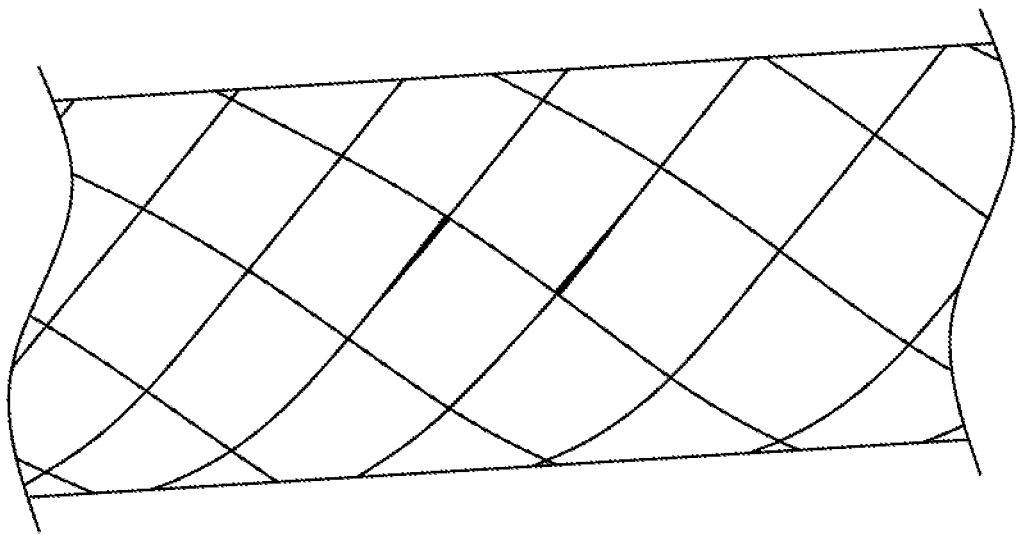
FIG. 16 shows a photograph showing an external appearance of a bat according to a sample 6 after the break acceleration step.

FIG. 14 shows a photograph showing an external appearance of the bat according to sample 4 after the break acceleration step. FIG. 15 shows a photograph showing an external appearance of the bat according to sample 5 after the break acceleration step. FIG. 16 shows a photograph showing an external appearance of the bat according to sample 6 after the break acceleration step.

As shown in FIG. 13, in sample 3, a crack was confirmed on a boundary line between the first stacking region and the second stacking region adjacent to each other and within the first stacking region and the second stacking region. Further, the crack of sample 3 was continuous to the boundary line and the inside of the first stacking region and the second stacking region adjacent to each other with the boundary line being interposed therebetween. The crack formed in the first stacking region and the second stacking region in sample 3 extends along the long side direction of the first fiber bundle or the second fiber bundle located at the inner circumferential side in the radial direction.

As shown in FIG. 15, in sample 5, a crack was confirmed only on a boundary line between the first stacking region and the second stacking region adjacent to each other. Further, the crack of sample 5 was continuous to a plurality of boundary lines.

Figure 17:
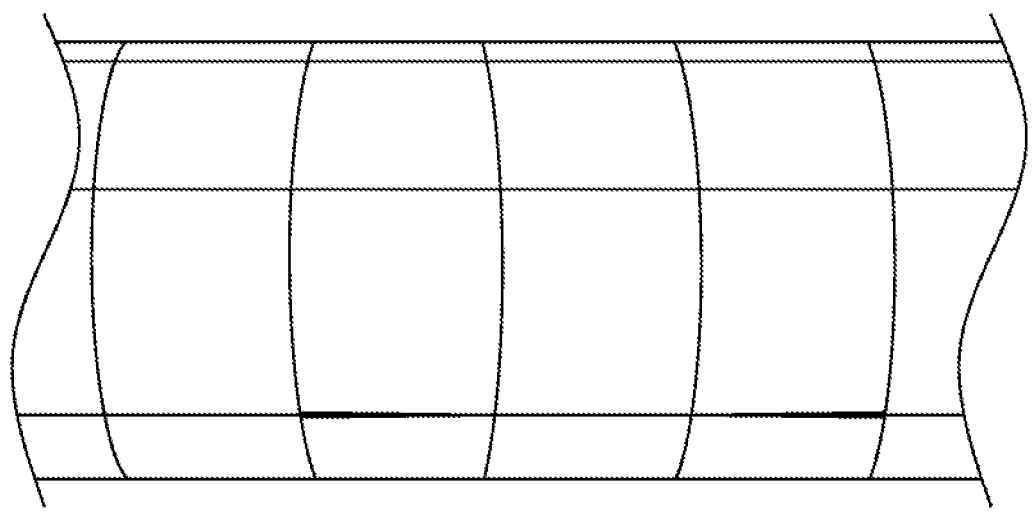
FIG. 17 shows a photograph showing an external appearance of a bat according to a sample 7 after the break acceleration step.

As shown in FIG. 14, FIG. 16, and FIG. 17, in each of sample 4 and sample 6, a crack was confirmed in at least one of the first stacking region and the second stacking region. In sample 4, a crack was confirmed only in the first stacking region. The crack extended along a direction inclined by 30° relative to the center axis in the first stacking region. That is, the crack extended along the long side direction of the second fiber bundle located at the inner circumferential side in the radial direction.

In sample 6, a crack was confirmed only in the first stacking region. The crack extended along a direction inclined by 45° relative to the center axis in the first stacking region. That is, the crack extended along the long side direction of the second fiber bundle located in the first stacking region at the inner circumferential side in the above-described radial direction. A distance of development of the crack in sample 6 was shorter than a distance of development of the crack in sample 4.

In view of the evaluation results of samples 3 to 6, it can be said that when the weight per unit area of first fiber-reinforced resin layer 10 is high, a crack is likely to be generated on the boundary line. In the normal ABI test, whether or not break occurs is confirmed by visually observing the surface. Specifically, it is recognized that the bat is broken only in the following case: whether the visually recognized crack is generated in the fiber-reinforced resin layer or is generated in the protective layer is determined by visually observing the surface thereof, and then it is determined that the crack is generated in the fiber-reinforced resin layer. Accordingly, it can be said that the crack can be determined readily as a whole.

Experiment 4

In the present experiment 4, an influence of first angle $\theta 1$ and second angle $\theta 2$ of first fiber-reinforced resin layer 10 on the result of the ABI test defined by the USA Softball was evaluated. For bat 100 according to the first embodiment, a sample 7 different from samples 4 and 6 in first angle $\theta 1$ and second angle $\theta 2$ was prepared in addition to samples 3 to 6 described above. Sample 7 was different from samples 4 and 6 only in first angle $\theta 1$ and second angle $\theta 2$. It should be noted that the other configurations of sample 7 were the same as those of samples 4 and 6.

Each of the ball hitting portions of samples 3 to 7 was compressed using a roller under the same conditions as those in the break acceleration step of the ABI test defined by the USA Softball, and was checked whether or not break occurred through visual observation of the surface thereof.

The evaluation results of samples 3 to 6 are as described above. FIG. 17 shows a photograph showing an external appearance of the bat according to sample 7 after the break acceleration step. In sample 7, a crack was confirmed in the first stacking region and the second stacking region. The crack extended in parallel with the center axis. That is, the crack extended in the second stacking region along the long side direction of the first fiber bundle located at the inner circumferential side in the radial direction, and extended in the first stacking region along the long side direction of the first fiber bundle located at the outer circumferential side in the radial direction.

Also in view of a comparison between the evaluation results of samples 3 and 5 and a comparison among the evaluation results of samples 4, 6 and 7, it can be said that a crack is more likely to be generated as first angle $\theta 1$ is larger and second angle $\theta 2$ is smaller or first angle $\theta 1$ is smaller and second angle $\theta 2$ is larger.

Figure 18:
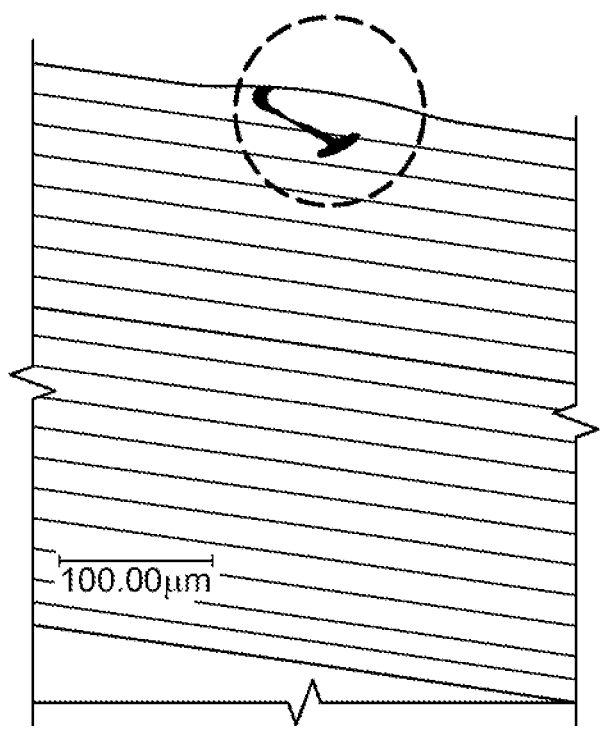
FIG. 18 shows a photograph showing a cross section of a crack formed after the break acceleration step.
Figure 19:
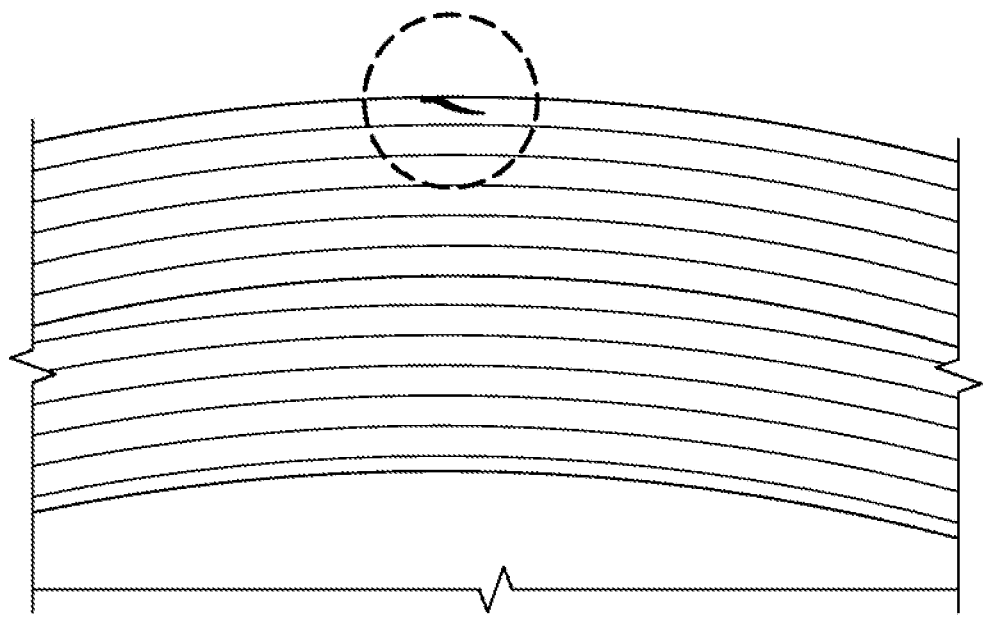
FIG. 19 shows a photograph showing a cross section of a crack formed after the break acceleration step.

FIG. 18 shows a photograph showing a cross section of the crack confirmed on the boundary line by the visual observation of the surface. FIG. 19 is a photograph showing a cross section of the crack confirmed in the first stacking region and the second stacking region by the visual observation of the surface. As shown in FIG. 18 and FIG. 19, each of the cracks was generated in the first fiber-reinforced resin layer, and it was confirmed that the crack was not generated only in the protective layer.

Experiment 5

Each of the bats including the same configurations as those of samples 1 to 7 was subjected to an endurance test to determine whether or not the bat could be endured to hit balls predetermined number of times. In the endurance test, as with experiments 1 to 4, it was determined that break occurred when a crack was confirmed by the visual observation of the surface. All the bats were not broken even though they hit balls the predetermined number of times, and passed the endurance test. It should be noted that first fiber-reinforced resin layer 10 is readily broken in the break acceleration step of the ABI test but is less likely to be broken in the endurance test presumably due to the following reasons: an amount of strains (compression amount) of the ball hitting portion in the break acceleration step is larger than an amount of strains of the ball hitting portion when hitting balls; and first fiber-reinforced resin layer 10 is configured to be readily broken by the amount of strains in the break acceleration step and is configured not to be broken by the amount of strains when hitting balls.

The examples above fall within the scope of the following claims. One having ordinary skill in the art will appreciate that the present disclosure can be practiced in embodiments other than those disclosed. The disclosed embodiments are presented for the purpose of illustration, rather than limitation.

The scope of the present invention is defined by the terms of the claims, and is intended to include any modifications within the scope and meaning equivalent to the terms of the claims.

What is claimed is:

1. A bat comprising:
    a grip portion;
    a tapered portion connected to the grip portion; and
    a ball hitting portion connected to the tapered portion and disposed to be aligned with the tapered portion and the grip portion in one direction, wherein
    a center axis of the ball hitting portion extends along the one direction,
    the ball hitting portion includes a plurality of fiber-reinforced resin layers stacked in a radial direction relative to the center axis,
    the plurality of fiber-reinforced resin layers include a first fiber-reinforced resin layer disposed at an outermost circumference in the radial direction among the plurality of fiber-reinforced resin layers,
    the first fiber-reinforced resin layer consists of a woven fabric in which a plurality of first fiber bundles extending in a first direction and a plurality of second fiber bundles extending in a second direction are woven,
    the plurality of fiber-reinforced resin layers further includes a plurality of second fiber-reinforced resin layers stacked at a side internal to the first fiber-reinforced resin layer, the plurality of second fiber-reinforced resin layers being separate and distinct from the first fiber-reinforced resin layer, and
    the plurality of second fiber-reinforced resin layers consists of a stack of non-woven sheets.

2. The bat according to claim 1, wherein the first fiber-reinforced resin layer includes a woven fabric in which the first fiber bundles and the second fiber bundles are plain-woven.

3. The bat according to claim 1, wherein the first fiber bundles and the second fiber bundles are spread tow fibers.

4. The bat according to claim 1, wherein
    the plurality of second fiber-reinforced resin layers are stacked through sheet winding or filament winding, and
    a weight per unit area of the first fiber-reinforced resin layer is larger than a weight per unit area of the plurality of second fiber-reinforced resin layers.

5. The bat according to claim 1, wherein a weight per unit area of the first fiber-reinforced resin layer is more than or equal to 80 g/m² and less than or equal to 300 g/m².

6. The bat according to claim 1, wherein when seen in the radial direction, one of an angle between the center axis and the first direction and an angle between the center axis and the second direction is more than 0° and less than 45°.

7. The bat according to claim 1, wherein a width of each of the first fiber bundles in a short side direction is more than or equal to 3 mm and less than or equal to 20 mm.

8. The bat according to claim 1, wherein each of the first fiber bundles and the second fiber bundles includes at least one selected from a group of a carbon fiber, a glass fiber, an aramid fiber, a polyethylene fiber, a poly-para-phenylenebenzobisoxazole (PBO) fiber, a basalt fiber, and a boron fiber.

9. The bat according to claim 1, wherein the ball hitting portion further includes a protective layer that covers the first fiber-reinforced resin layer and that forms an outermost layer of the ball hitting portion.

10. The bat according to claim 1, wherein only the ball hitting portion includes the first fiber-reinforced resin layer.

11. The bat according to claim 1, wherein the first fiber-reinforced resin layer is wrapped around an outer surface of the second fiber-reinforced resin layers.

* * * * *